Patented June 17, 1930

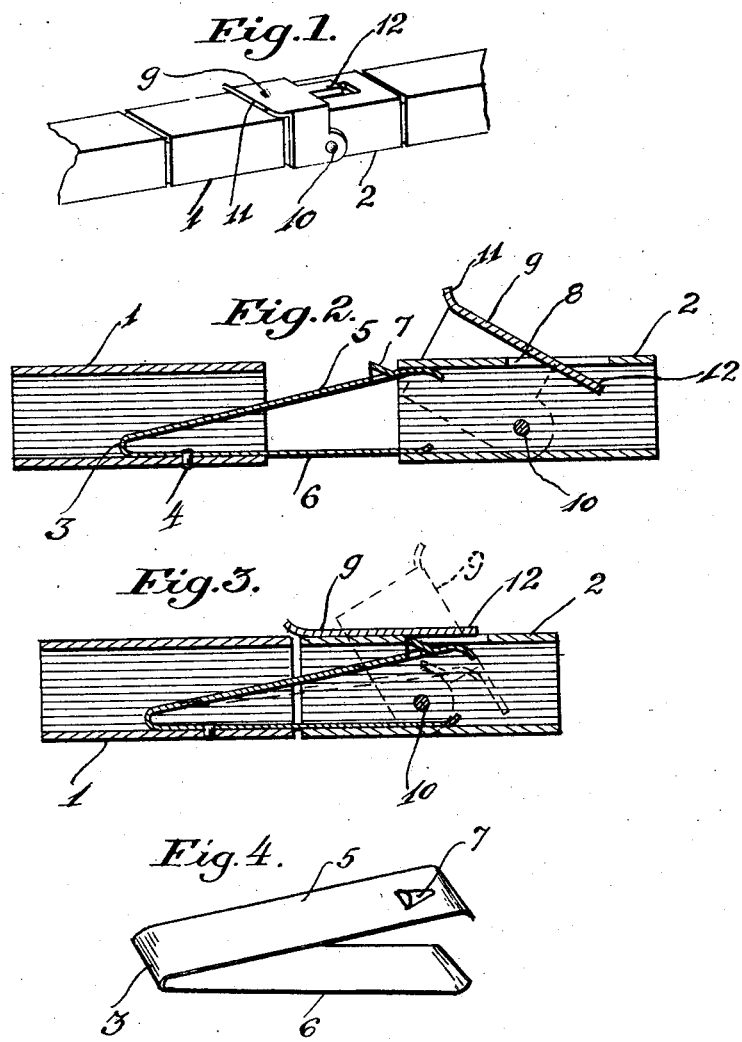

1,764,240

UNITED STATES PATENT OFFICE

ABRAHAM BLUSTEIN, OF WASHINGTON, DISTRICT OF COLUMBIA

SAFETY SPRING CLASP

Application filed February 21, 1929. Serial No. 341,736.

One object of my invention is to make a safety spring catch or clasp which should afford a safe locking means when in locked position without any danger of becoming unfastened, unless and until unlocked by a person.

Another object of my invention is to make a safety catch or clasp of simple and durable construction, and of neat appearance.

Another object of my invention is to make a safety catch which should be easy to operate when locking and unlocking the same.

Other objects and advantages may appear from the following description taken in connection with the drawing, in which:

Fig. 1 is a perspective view of my safety clasp shown for the purpose of illustration in a section of a bracelet.

Fig. 2 is a sectional elevation of my safety clasp unlocked.

Fig. 3 is a sectional elevation of the safety clasp in locked position.

Fig. 4 is a perspective view of the spring.

Referring more in detail to the drawings, wherein the same characters designate the same parts, my clasp consists of a male member 1 and a female member 2. The male member 1 comprises a hollow shell $1^a$ and a locking spring 3 secured thereto, as by soldering or by a rivet, 4. As is clear from the drawing, this locking spring is of the conventional leaf spring construction consisting of a flat strip of hard metal bent substantially at its middle not quite to a sharp point. The object of this is to retain the flexibility of the spring so as to avoid its premature breaking. The general shape of the spring is substantially an acute angle with a rounded vertex having an upper leg 5 and a lower leg 6.

In the upper leg of the spring I strike out a nose or detent 7, which cooperates with the forward edge of a slot 8 formed in the female member, whereby the male and female members are held locked.

On the female member I attach a yoke 9 by means of a pivot 10. The yoke member is provided at its forward end with a nail grip 11, and with a tail or detent 12 at its rear end. The leading ends of the leaf spring are slightly curved-in, as clearly shown in Figs. 2 and 3, to insure ease of operation when the clasp is to be locked.

The device is operated as follows: for locking, the leading ends of the spring are inserted into the end of the female member (this being facilitated by the curved ends of the spring), and the two members 1 and 2 are forced toward each other until the nose 7 of spring finds its way into the slot 8 of the female member. At the same time the yoke 9 will be snapped into closed or flat position as shown in Figs. 1 and 3.

Held by the upward action of the spring, the yoke remains in this position with the tail 12 over the slot. For unlocking, the yoke 9 is raised about its pivot by means of the nail grip 11 into the dotted line position of Fig. 3, when the tail 12 will press down the nose of the spring to disengage it from the slot 8, and the members 1 and 2 may then be readily pulled apart.

As will be apparent to those skilled in the art, numerous variations can be made without departing from the scope and spirit of my invention. For example, the spring member 3 may be of a different type.

I claim:

1. A safety spring clasp comprising a male member, a female member, a locking spring secured to said male member, a locking means on said spring, said female member having a slot therein to cooperate with said locking means for the purpose of locking the two members together, the locking means entering the slot and engaging a wall thereof, a yoke pivoted to said female member and provided with a tail for depressing the said locking means into unlocked position.

2. As an article of manufacture, a safety clasp having in combination a male member and a female member with means for locking the same together, said means comprising a spring secured to said male member and a locking detent on said spring cooperating with a slot in said female member by entering the slot and engaging a wall thereof, and means for unlocking the said members comprising a yoke pivoted on said female member, and a tail on said yoke for disengaging the said locking detent from the slot.

3. A safety catch having in combination a male member and a female member, means for locking the said members together comprising a spring forming a part of one member, a locking nose on the spring cooperating with a slot in the other member, by entering the slot and engaging a wall thereof, and pivoted means on one of said members for disengaging the said locking nose from the slot to affect unlocking.

4. A safety catch comprising two members which are separately secured together, one of said members having a slot and the other of said members having means cooperating with said slot to lock the members together, and additional means on one of said members passing thru said slot and cooperating with said means to unlock the members.

In testimony whereof I affix my signature.

ABRAHAM BLUSTEIN.